United States Patent [19]

Smith, II

[11] Patent Number: 4,641,209
[45] Date of Patent: Feb. 3, 1987

[54] DISC TYPE INFORMATION STORAGE AND RETRIEVAL SYSTEM

[75] Inventor: Robert R. Smith, II, Los Altos Hills, Calif.

[73] Assignee: Micro Storage Ltd., Manhattan Beach, Calif.

[21] Appl. No.: 555,892

[22] Filed: Nov. 28, 1983

[51] Int. Cl.⁴ .................... G11B 5/012; G11B 21/06; G11B 23/03
[52] U.S. Cl. ............................... 360/86; 360/97; 360/107; 360/133
[58] Field of Search .................. 360/97–99, 360/86, 106, 107, 74.6, 1–3, 133

[56] References Cited

U.S. PATENT DOCUMENTS

| | | | |
|---|---|---|---|
| 2,690,340 | 9/1954 | Harrison | 360/107 |
| 3,046,357 | 7/1962 | Fujimoto | 360/86 |
| 3,322,427 | 5/1967 | Fujimoto | 360/107 X |
| 3,566,132 | 2/1971 | Walker | 360/74.6 |
| 3,787,636 | 1/1974 | Brandt | 360/107 X |
| 4,305,104 | 12/1981 | Donohue | 360/97 X |
| 4,377,761 | 3/1983 | Staciokas | 360/86 |
| 4,437,132 | 3/1984 | Shimaoka | 360/99 |
| 4,466,032 | 8/1984 | Saito | 360/99 |

FOREIGN PATENT DOCUMENTS 57-98137  6/1982  Japan .................................. 360/99

Primary Examiner—A. J. Heinz
Attorney, Agent, or Firm—Flehr, Hohbach, Test, Albritton & Herbert

[57] ABSTRACT

A disc type of information storage and retrieval system is disclosed herein. This system utilizes a cartridge type of information storage disc arrangement including a rotating disc and its own bearing pin about which the disc rotates and an information retrieval arrangement including means for supporting the disc arrangement in an operating position. The disc arrangement and the information retrieval arrangement include cooperating means for moving a read head forming part of the retrieval arrangement in one direction along a straight line path in response to the clockwise rotation of the rotating disc and in the opposite direction along the same path in response to the counterclockwise rotation of the rotating disc. The overall assembly includes other features as well.

35 Claims, 30 Drawing Figures

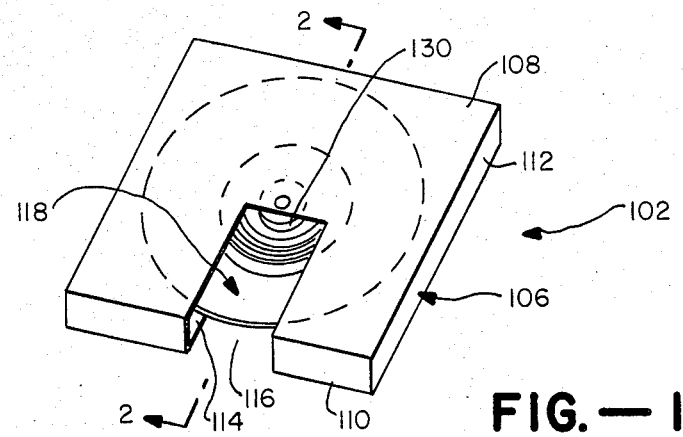
FIG.—1
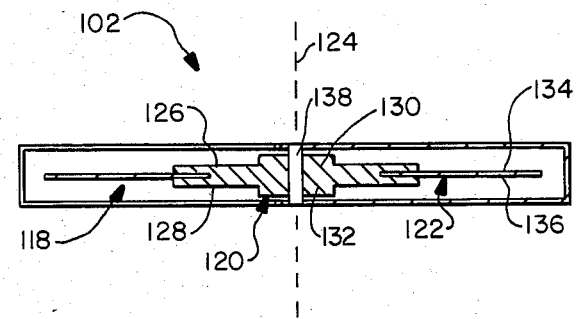
FIG.—2
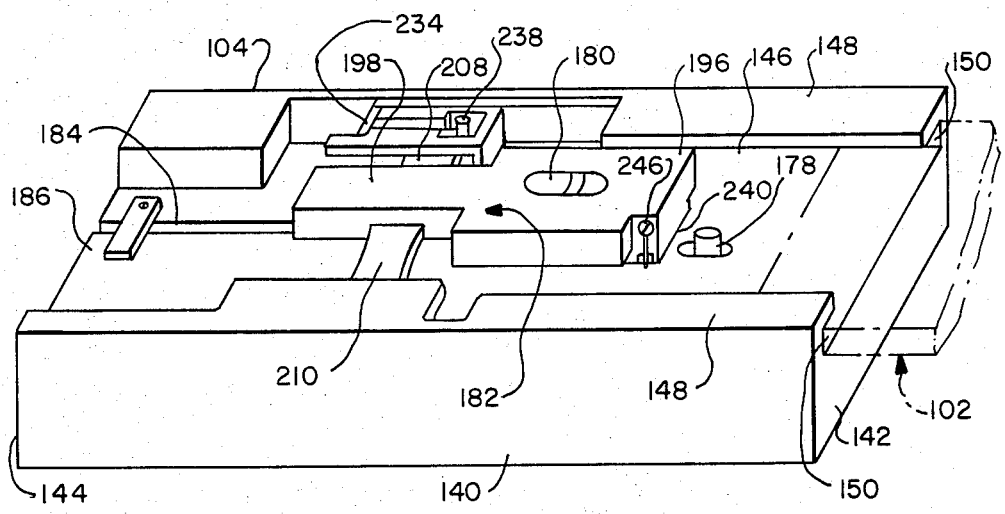
FIG.—3

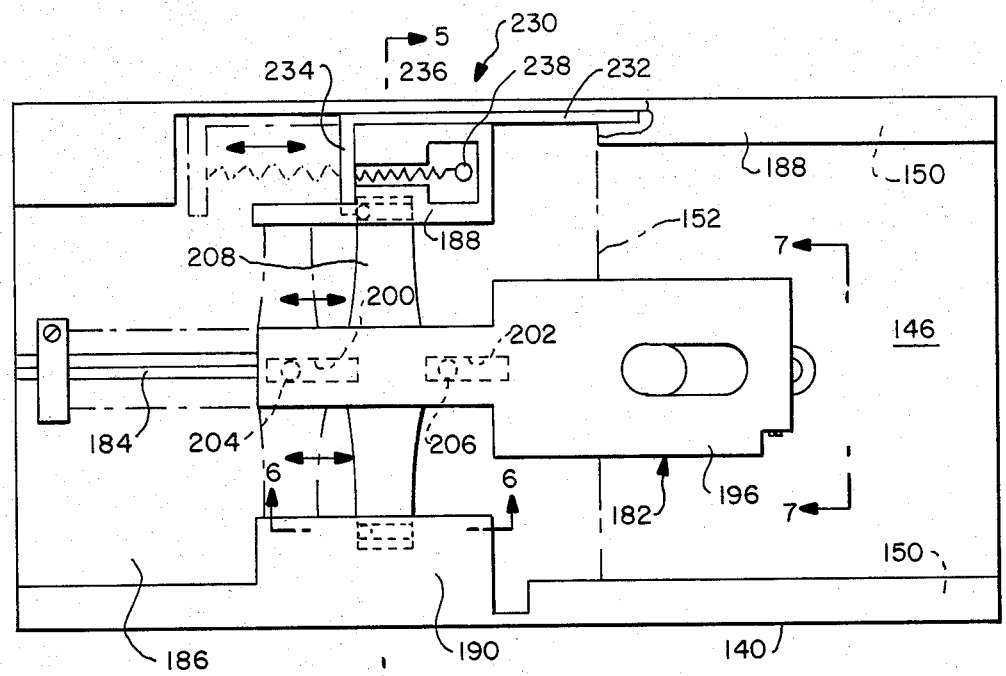
FIG.—4
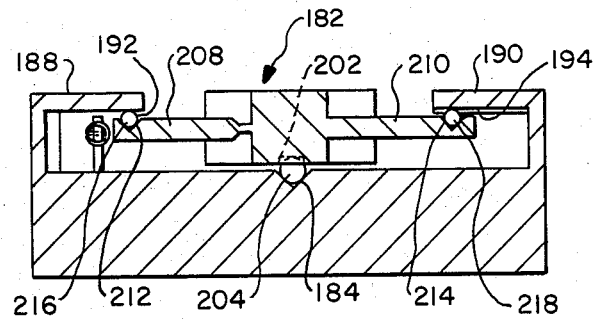
FIG.—5
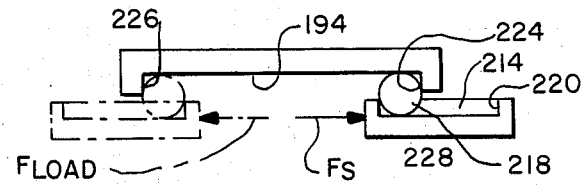
FIG.—6
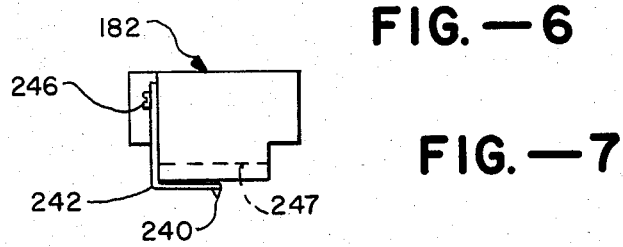
FIG.—7

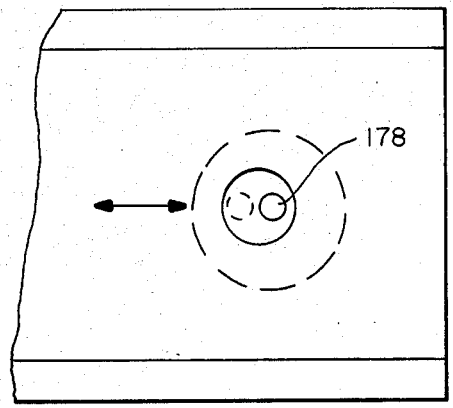
FIG.—8
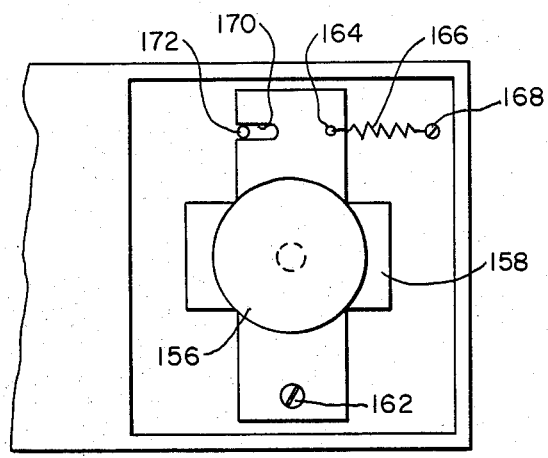
FIG.—9
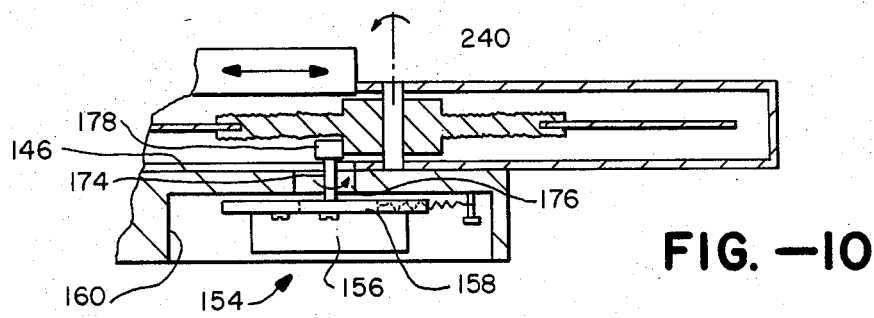
FIG.—10
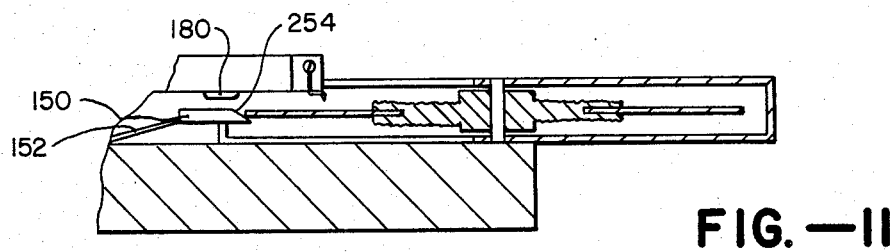
FIG.—11

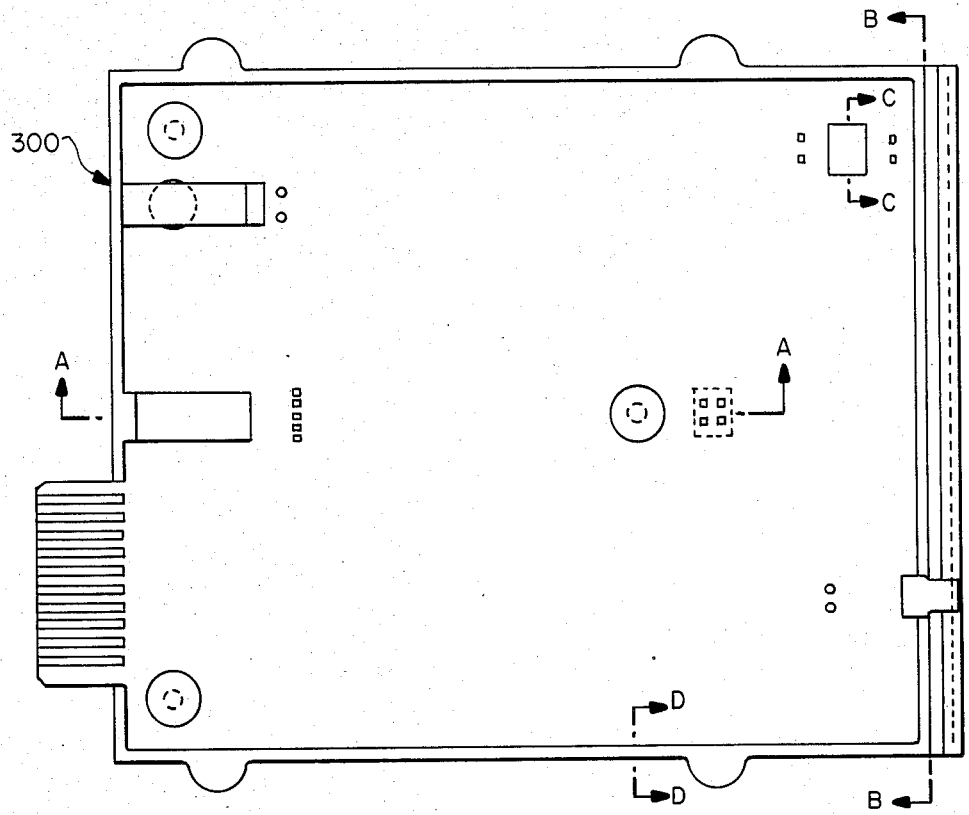
FIG.—12
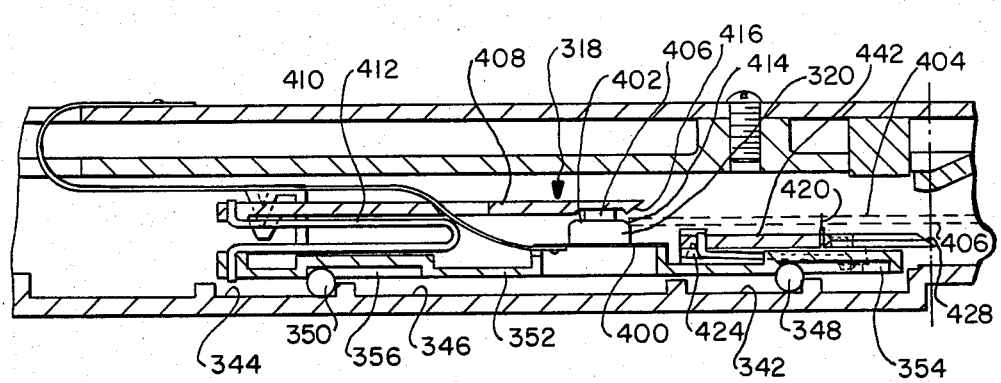
SECTION A-A
FIG.—13

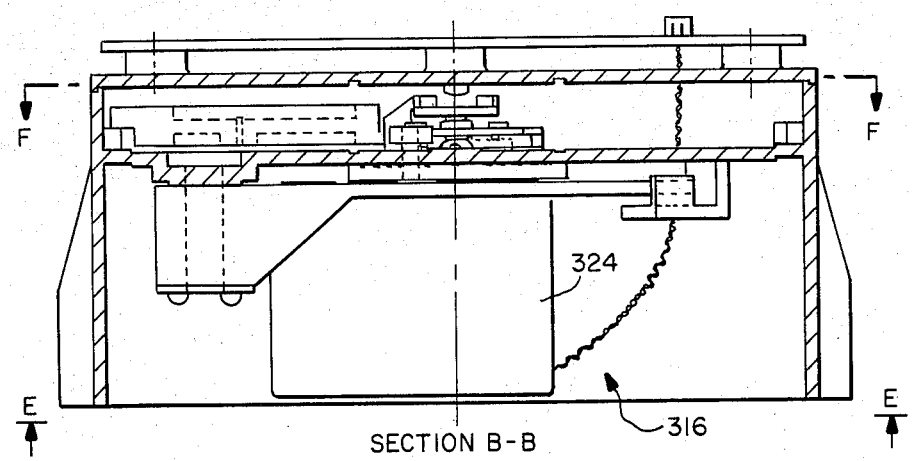
FIG.—14
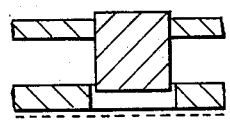
FIG.—15
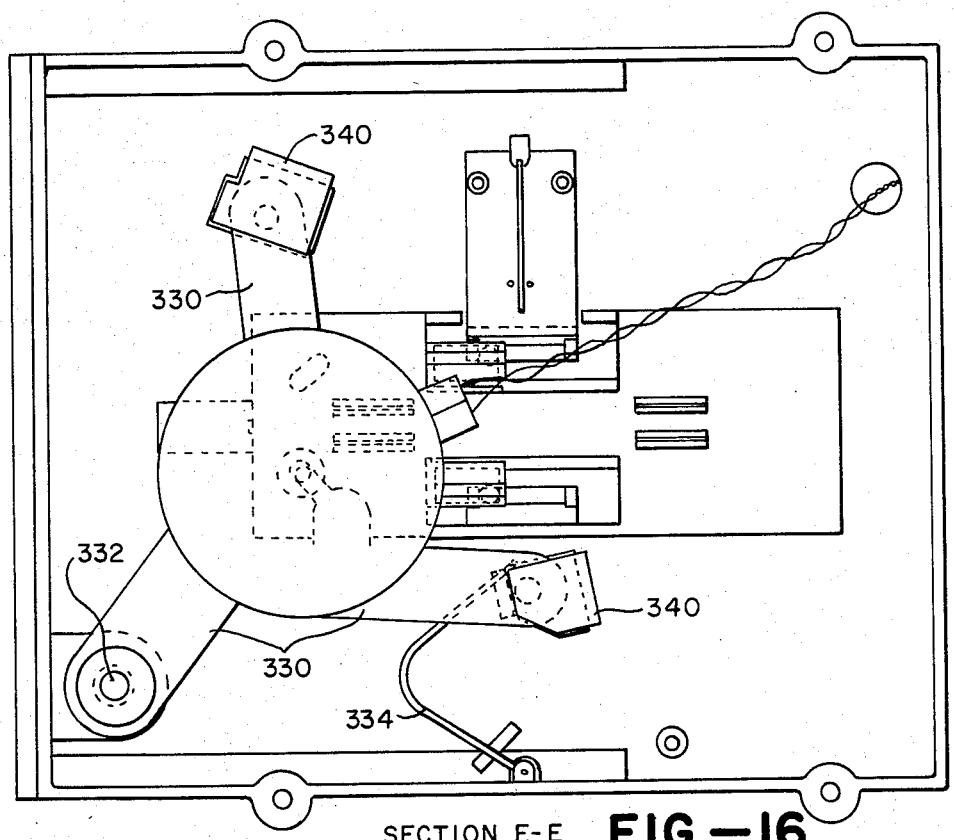
FIG.—16

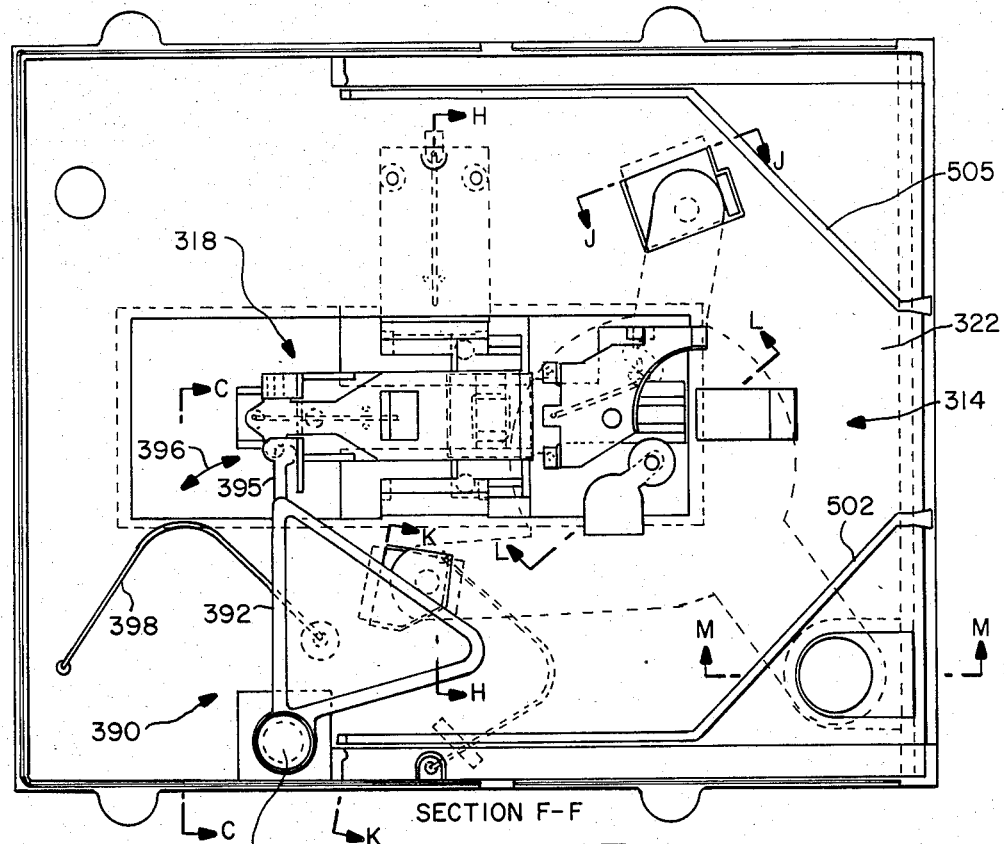
FIG.—17
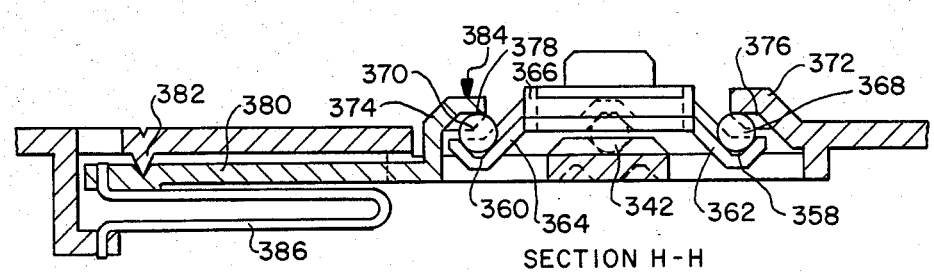
FIG.—18
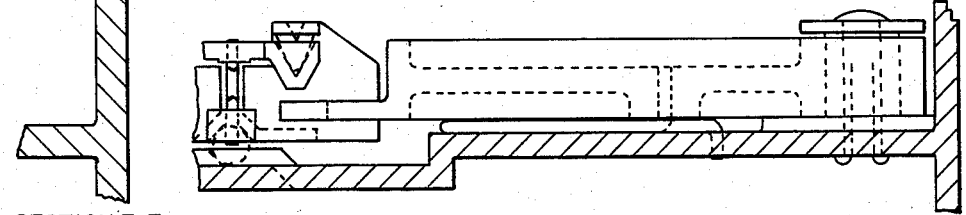
SECTION E-E
FIG.—20
SECTION G-G
FIG.—19

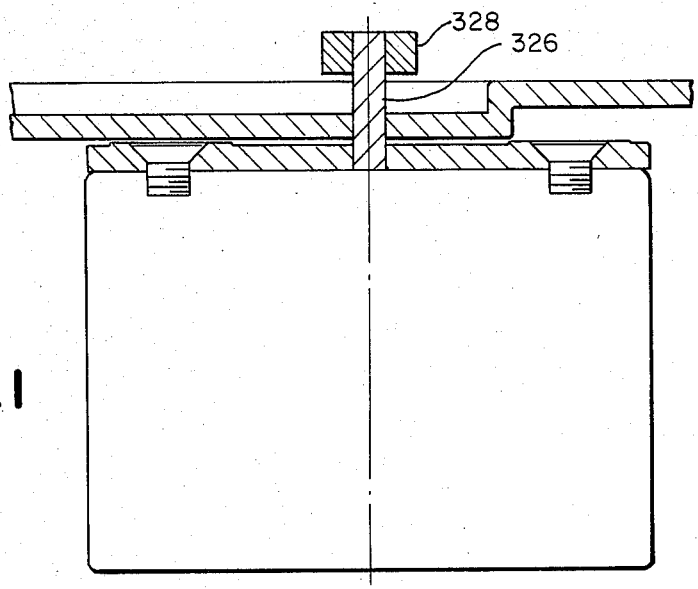
FIG.—21
SECTION L-L
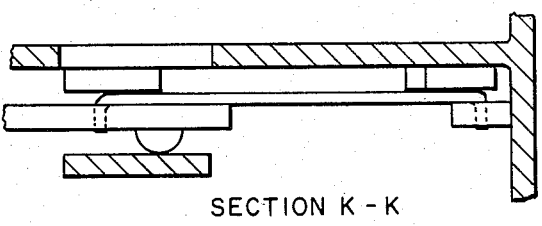
SECTION K-K
FIG.—22
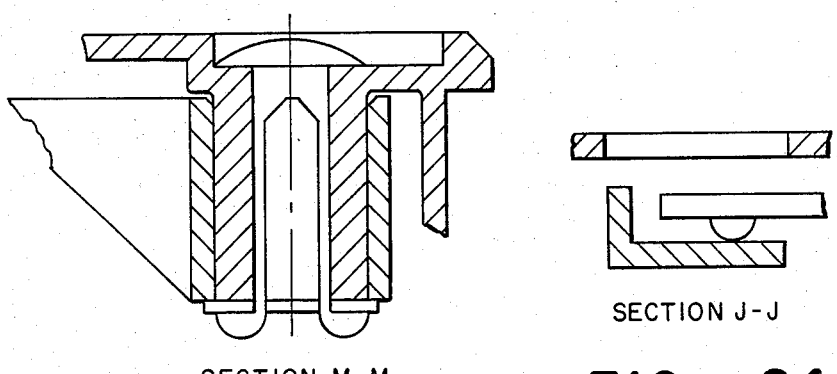
SECTION M-M
FIG.—23
SECTION J-J
FIG.—24

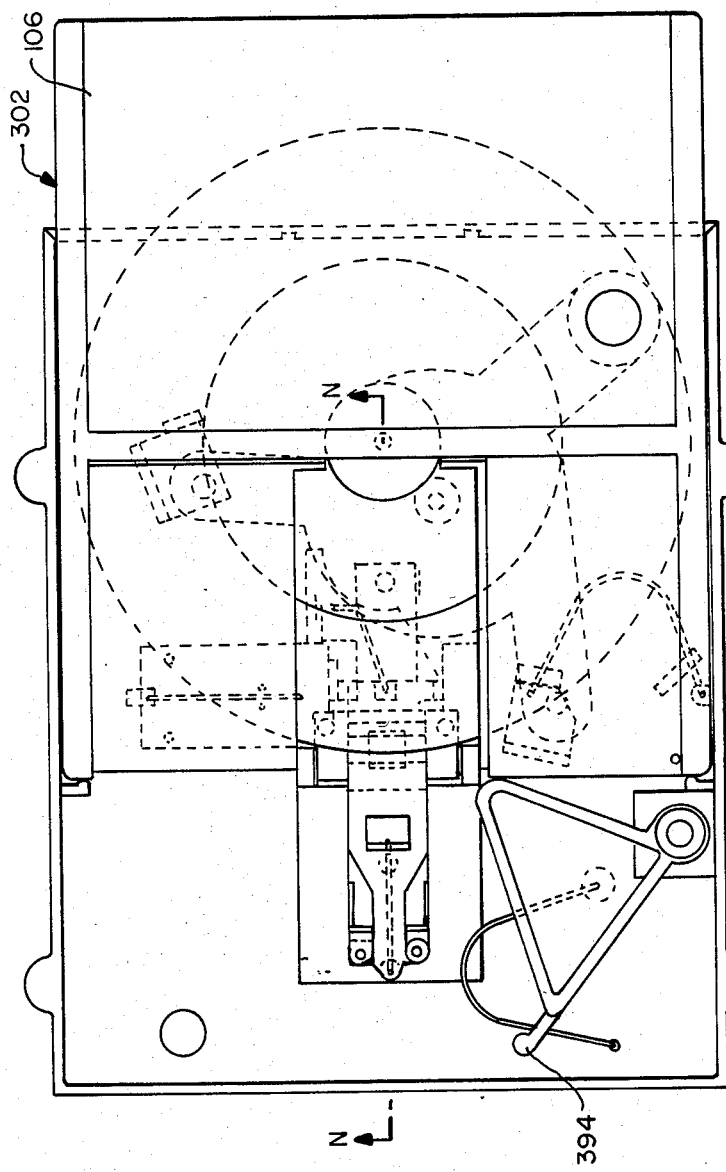
FIG.-25
FIG.-26
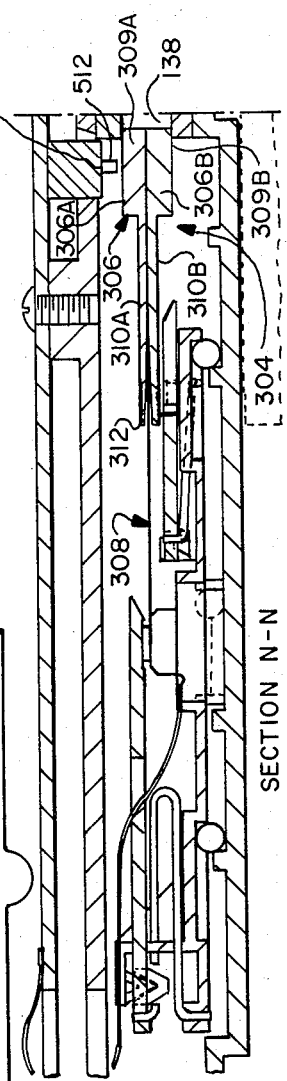
SECTION N-N

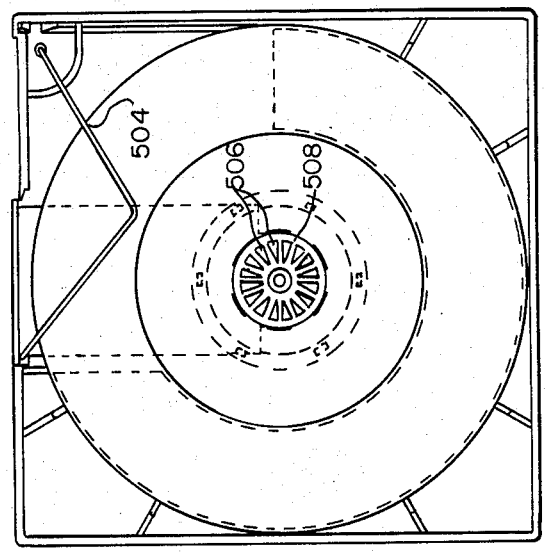
FIG.—28
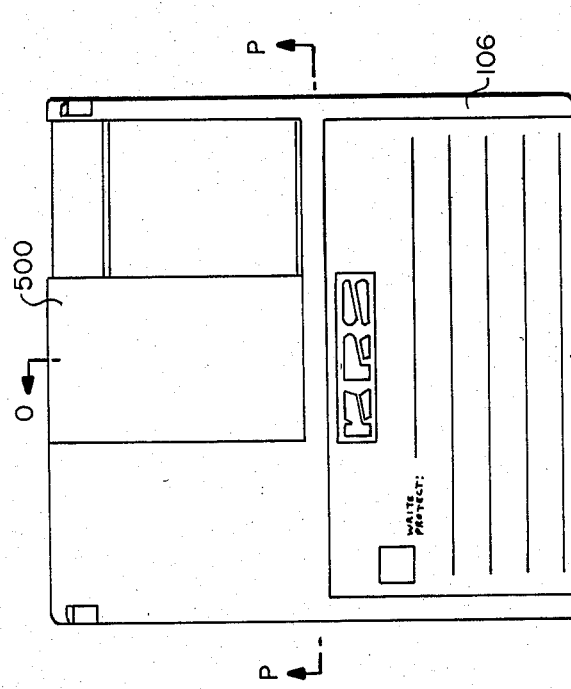
FIG.—27
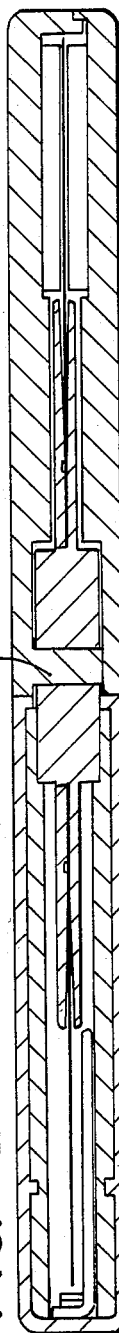
FIG.—29 SECTION O-O
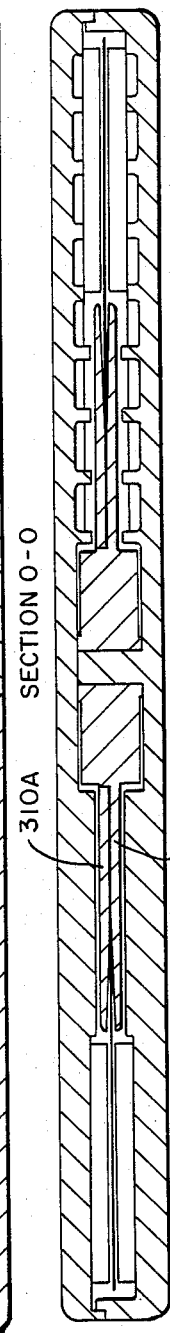
FIG.—30 SECTION P-P

DISC TYPE INFORMATION STORAGE AND RETRIEVAL SYSTEM

The present invention relates generally to information storage and retrieval systems of the general type which utilize information containing cartridges and more particularly to various specific design features of a particular disc type system.

There are presently many different types of information storage and retrieval systems which utilize information containing cartridges or cassettes. For purposes herein, the term cartridge will be used in reference to either a cartridge or a cassette.

The present invention is specifically concerned with information storage and retrieval systems which utilize the cartridge type of discs for storing and retrieving information. Heretofore, the "disc drives" forming parts of these systems have been relatively complicated and therefore expensive. Accordingly it is an object of the present invention to provide a relatively uncomplicated and inexpensive but yet reliable disc drive type of information storage and retrieval system including a drive assembly or disc drive as it is sometimes called and a cartridge assembly.

A more particular object of the present invention is to provide a specifically designed cartridge assembly having a cartridge housing and a disc which always remains within the housing, even when operating in the disc drive, whereby to eliminate any concern with variations in manufacturing tolerances from one cartridge to another.

Another particular object of the present invention is to provide a disc drive having a movable carriage which is practically friction free and which moves reliably in a fixed plane merely by means of four ball bearings and uncomplicated cooperating structure.

Still another particular object of the present invention is to provide an uncomplicated structural technique for engaging a storage disc forming part of the cartridge assembly against a read/write head forming part of the disc drive during operating of the overall information storage and retrieval system.

As will be seen hereinafter, this system or information storage and retrieval assembly as it is referred to includes both a cartridge type of information storage disc arrangement and an information retrieval arrangement. The disc arrangement includes a cartridge housing having bearing means therein, preferably a bearing pin, and a storage disc mount within the housing in cooperating engagement with the bearing means so as to rotate about a central axis of rotation. The disc has opposite sides located within the housing, at least one side of which includes information stored magnetically thereon in a given area extending concentrically around the central axis. The information retrieval arrangement includes means supporting the disc arrangement in a predetermined operating position for rotation of the disc about its central axis. This latter arrangement also includes a magnetic read/write head and means supporting the latter for movement back and forth along a fixed, straight line path radially across the information containing area of the disc body and in sufficiently close proximity to that area to magnetically retrieve the information stored therein. Finally, the overall assembly includes means for rotating the disc about its central axis, in both a clockwise and a counterclockwise direction, when the disc arrangement is in its predetermined operating position and means forming part of the disc arrangement and part of the information retrieval arrangement for moving the read/write head in one direction along its straight line path in response to the clockwise rotation of the disc arrangement and in the opposite direction along the path in response to the counterclockwise rotation of the disc arrangement.

In a preferred embodiment of the information storage and retrieval system just described, the disc body carries a spiral groove and the magnetic read/write head support means includes a movable carriage mounted on the above-recited ball bearings and carrying a needle which cooperates with the groove to move the head in the manner recited. In the same preferred embodiment, the disc arrangement and information retrieval arrangement are designed to readily and reliably place the storage disc in its operating position against the read/write head and include cooperating gears which engage one another when the disc is placed in its operating position so as to cause the disc to rotate. Moreover, this is accomplished without having to use a central drive spindle which heretofore (in prior art disc drives) has been required along with a cooperating central opening in the disc. In the present embodiment, the information storage arrangement includes means for horizontally guiding its disc arrangement into its predetermined operating position without having to vertically drop it onto an awaiting spindle which was necessary when using a spindle type arrangement.

The overall information storage and retrieval system disclosed herein will be described in more detail hereinafter in conjunction with the drawings wherein:

FIG. 1 is a perspective view of the cartridge type of information storage disc arrangement forming part of an overall information storage and retrieval system or assembly designed in accordance with one embodiment of the present invention;

FIG. 2 is a cross sectional view of the arrangement illustrated in FIG. 1 taken generally along lines 2—2 in FIG. 1;

FIG. 3 is a perspective view of an information retrieval arrangement forming part of this second system or assembly embodiment just recited;

FIG. 4 is a top plan view of the arrangement illustrated in FIG. 3;

FIG. 5 is a cross sectional view of the arrangement illustrated in FIG. 4, taken generally along line 5—5 in FIG. 4;

FIG. 6 is a sectional view of a portion of the arrangement illustrated in FIG. 4, taken generally along line 6—6 in FIG. 4;

FIG. 7 is a sectional view of a portion of the arrangement illustrated in FIG. 4, taken generally along line 7—7 in FIG. 4;

FIG. 8 is a planar view illustrating a part of the top side of the arrangement of FIG. 4 with certain components of the latter removed for purposes of clarity;

FIG. 9 is a plan view illustrating the underside of the part of the arrangement illustrated in FIG. 4;

FIG. 10 diagrammatically illustrates how portions of the disc arrangements of FIGS. 1 and 2 and the information retrieval arrangement of FIGS. 3 and 4 cooperate with one another;

FIG. 11 diagrammatically illustrates another way in which these two latter arrangements referred to immediately above cooperate with one another;

FIG. 12 is a plan view of a cartridge type of information storage disc arrangement, e.g., a disc drive, designed in accordance with a second, actual working embodiment of the present invention;

FIG. 13 is a vertical sectional view of the disc drive of FIG. 12, taken generally along line A—A in FIG. 12;

FIG. 14 is a vertical sectional view of the disc drive of FIG. 12, taken generally along line B—B in FIG. 12;

FIG. 15 is a sectional detail of the same disc drive, taken generally along line C—C in FIG. 12;

FIG. 16 is a view of the underside of the disc drive, as taken generally along the line E—E in FIG. 14;

FIG. 17 is a sectional view of the disc drive, actually a plan view without the disc drive's cover, as taken generally along line F—F in FIG. 14;

FIG. 18 is a sectional view of the disc drive shown in FIG. 17, taken generally along line H—H in FIG. 17;

FIG. 19 is a sectional view of the disc drive illustrated in FIG. 17, taken generally along line G—G in FIG. 17;

FIG. 20 is a sectional detail of the disc drive shown in FIG. 12, taken generally along line D—D in FIG. 12;

FIG. 21 is a sectional view of the disc drive illustrated in FIG. 17, taken generally along line L—L in FIG. 17;

FIG. 22 is a sectional view of the disc drive illustrated in FIG. 17, taken generally along line K—K in FIG. 17;

FIG. 23 is a sectional detail of the disc drive illustrated in FIG. 17, taken generally along line M—M in FIG. 17;

FIG. 24 is a sectional detail of the disc drive of FIG. 17, taken generally along line J—J of FIG. 17;

FIG. 25 is a view similar to FIG. 17 of the disc drive in combination with the cartridge type information storage disc arrangement which is designed in accordance with an actual working embodiment of the present invention and which is shown in an operating position within the disc drive;

FIG. 26 is a vertical sectional view of the combination shown in FIG. 25, taken generally along line N—N in FIG. 25;

FIG. 27 is a plan view of the cartridge type information storage disc arrangement illustrated in FIG. 25 but shown apart from the disc drive;

FIG. 28 is a view of the overall disc arrangement shown in FIG. 27 but with the cover of the disc arrangement removed;

FIG. 29 is a sectional view of the disc arrangement illustrated in FIG. 27, taken generally along line O—O in FIG. 27; and FIG. 30 is a sectional view of the disc arrangement illustrated in FIG. 27, taken generally along line P—P in FIG. 27.

Turning to the drawing, wherein like components are designated by like reference numerals throughout the various figures, attention is directed to FIGS. 1–11 for a detailed description of an information storage and retrieval system or assembly designed in accordance with one embodiment of the present invention. This overall assembly includes a cartridge type of information storage disc arrangement (hereinafter referred to a "disc cartridge") generally indicated at 102 in FIGS. 1 and 2 and an information storage and retrieval arrangement (hereinafter referred to as a "disc drive") generally indicated at 104 in FIGS. 3 and 4.

Referring specifically to FIGS. 1 and 2, attention is directed to the disc cartridge 102. As seen there, this cartridge includes an outermost generally rectangular housing 106 having top and bottom sides 108 and 110, respectively, four sidewalls 112 and an inner chamber 114. An opening generally indicated at 116 in one of the sidewalls 112 and also in sections of the top and bottom sides 108 and 110 provides access into chamber 114 which contains a disc 118. While not shown, the cartridge may also include a sliding cover of the type described in application Ser. No. 455,474, filed Jan. 4, 1983.

As best illustrated in FIG. 2, disc body 118 is comprised of separate inner and outer body segments 120 and 122 both of which are concentrically disposed around a central axis indicated by dotted lines at 124. Inner segment 120 which is constructed as an integral unit of relatively rigid material, for example, rigid plastic, includes opposite top and bottom sides containing spiral grooves 126 and 128, respectively, each of these grooves extending concentrically around axis 124 starting at a point radially outward a predetermined distance therefrom and turning outwardly therefrom. An upper hub 130 and a lower hub 132 extend upwardly and downwardly from the top and bottom sides of segment 120, respectively, radially inward of grooves 126, 128 but also concentrically around central axis 124. The reasons for these grooves and hubs will become apparent hereinafter. For the moment it suffices to say that they serve as driven gears to be acted on by a cooperating drive gear in order to rotate due body 118, as will be seen.

As best seen in FIG. 2, segment 122 of disc body 118 is fixedly connected to the outer rim of segment 120 and is substantially thinner than this latter segment. More specifically, in the particular embodiment illustrated, segment 122 is constructed of typical "floppy disc" material and specifically serves to store information magnetically on its top side 134 and on its bottom side 136 in respective areas which are concentric with axis 124 and which circumscribe inner segment 120. The entire disc 118 including segments 120 and 122 is supported for rotation about axis 124 by means of a pin bearing 138 which extends vertically between and is fixedly connected to the top and the bottom sides 108, 110 of housing 106 at a centrally located point within chamber 114 so that an entire radial section of information containing segment 122 of the disc is exposed to the ambient surroundings by opening 116, as best illustrated in FIG. 1. For reasons to become apparent hereinafter, it is also important that a circumferential section of each of the hubs 130, 132 be exposed and readily accessible through opening 116.

Turning now to FIGS. 3–11, attention is directed to information retrieval arrangement or disc drive 104. Referring first to FIGS. 3 and 4, disc drive 104 is shown including what may be referred to as an overall, fixed support base 140 having a front loading end 142 and a back end 144. This base defines an upwardly facing, horizontally extending surface 146 for slidably receiving and supporting disc cartridge 102 in a predetermined operating position, as indicated by dotted lines in FIG. 3. To this end, confronting flanges 148 extend horizontally inward toward one another above surface 146 and cooperate with the latter to define guideways 150 for directing the disc arrangement 102 into its operating position. As illustrated in FIG. 4, guideways 150 extend only part way along the length of base 140 from its front end to its back end. When disc cartridge 102 is moved over surface 146 to the point where its front side (the side including opening 116) reaches the imaginary dotted line 152 in FIG. 4, it is in its predetermined operating position. As will be seen below, with disc cartridge 102 in this position, a drive mechanism generally indicated at 154 in FIG. 10 and forming part of disc drive 104 serves to rotate disc 118 in both a clockwise and counterclockwise direction about bearing pin 138 in a controlled manner.

Referring specifically to FIG. 10 in conjunction with FIGS. 3, 4, 8 and 9, attention is directed to drive mechanism 154. As seen in these figures, the mechanism includes a reversible motor 156, preferably an electrically energized motor, mounted to the underside of a support plate 158 which is best seen in FIG. 9. The motor 156 and support plate 158 are disposed within a cooperating pocket 160 in the underside of base 140 directly below surface 146. Support plate 158 is pivotally mounted at one end to the inside surface of this pocket by means of a suitable pivot pin 162. The opposite end of the support plate is fixedly connected by means of screw 164 to one end of a spring 166 which has its other end fixedly connected to base 140 in pocket 160 by means of a second screw 168. In this way, the spring 166 spring biases the support plate 158 and therefore motor 156 in the position illustrated in FIG. 9. At the same time, the entire support plate 158 and the motor 156 are movable from this biased position in a direction away from screw 168. To this end, the support plate also includes an opened slot 170 which is configured to receive a third screw 172 in a slidable manner for guiding the support plate and motor between its biased position illustrated in FIG. 9 and its extended position further from screw 168 by an amount equal to the length of slot 170.

As best illustrated in FIG. 10, motor 156 includes its own output shaft 174 and means not shown for rotating the shaft in both a clockwise and counterclockwise direction about its own axis in a controlled, predetermined manner. The output shaft 174 extends vertically upward through a substantially wider opening 176 in base 140 between surface 146 and pocket 160. The shaft is sufficiently long to include an uppermost section or puck 178 which projects up beyond surface 146. The overall drive mechanism 154 is positioned within pocket 160 and the opening 176 is positioned such that puck 178 is located at a predetermined point along surface 146. Specifically, when disc cartridge 102 is moved into its predetermined operating position over surface 146, puck 178 is positioned to automatically engage the circumferential shoulder forming part of lower hub 132 sufficient to cause the hub and therefore the entire disc 118 to rotate about bearing pin 138 when the shaft 174 is caused to rotate about its own axis. Thus, the puck 178 serves as the above-referred to cooperating drive gear for engaging the hub which serves as the driven gear to rotate disc body 118.

In a preferred embodiment, puck 178 and hub 132 (e.g., the drive and driven gears) are configured such that the frictional engagement between the two allows the hub to be rotated by the puck, although the two could be provided with intermeshing teeth. In either case, the entire motor 156 including its shaft 174 is spring-loaded in the manner described above so that it is not necessary to provide high tolerance positioning between the hub and puck to ensure the proper engagement between the two. It is only necessary that the disc cartridge 102 be moved into its operating position sufficiently far into arrangement 104 to force hub 132 against puck 178. Once the hub engages the puck, spring 166 will ensure continued engagement between the two by pulling the puck back against the hub.

From the foregoing description of drive mechanism 154 in conjunction with hub 132, it should be apparent that overall disc arrangement 102 can be moved into its operating position while remaining in a given horizontal plane during this entire positioning procedure. The overall assembly making up cartridge 102 and disc drive 104 does not require that the disc body be dropped over an awaiting spindle as in many prior art devices. In this way, the grooves 126 and 128 and the information bearing segment 122 of the disc body can be accurately positioned relative to base 140, especially in the vertical direction, which is an important factor, as will be seen hereinafter. At the same time, the disc cartridge itself provides its own "frame of reference" for rotation of the disc 118, e.g., the pin bearing 138. In this way, there need be no concern with variations in manufacturing tolerances from one cartridge to another, since they do not rely on an external bearing means for rotation. As a result, they can be manufactured relatively inexpensively.

Another advantage in utilizing the combination of drive mechanism 154 and hub 132 for rotating disc body 118 about its pin bearing 138 resides in the speed reduction capabilities which are achievable by utilizing this approach. More specifically, by providing hub 132 and puck 178 with the same diameters, disc body 118 can be rotated at the same speed as shaft 174. On the other hand, it is possible to utilize a high speed motor 156 and therefore a high speed shaft while, at the same time, rotating the disc body at a substantially slower speed by designing hub 132 to have a substantially larger diameter than puck 178. This has the advantage of allowing the overall assembly to include a relatively inexpensive high speed motor for driving a substantially slower speed disc rather than requiring a more expensive low speed motor which would otherwise be necessary using a direct drive approach which calls for a 1:1 speed ratio only.

Returning to FIG. 3 in conjunction with FIGS. 4–7, information retrieval arrangement or disc drive 104 is shown including a readily providable magnetic read/write head 180 which is mounted by suitable means not shown to the underside of a carriage generally indicated at 182. As will be seen below, base 140 includes various components for supporting carriage 182 for movement back and forth along a fixed, straight line path within a fixed horizontal plane such that the read/write head moves back and forth along its own fixed, straight line path radially across the information containing top side of disc body segment 122 in the area exposed by opening 116 when the entire disc cartridge is located in its predetermined operation position. Moreover, with the disc cartridge in this position, the head is in sufficiently close proximity to information containing side 134 to magnetically retrieve the information stored therein as the disc body is rotated about its central axis 124. While the read/write head has been described as moving along a straight-line path, it could be moved along an arcuate path along with its carriage.

Referring specifically to FIGS. 4 and 5 in conjunction with FIG. 3, the various components of base 140 for supporting carriage 182 in the manner just described are best seen. These components include a vertically upwardly facing central raceway 184 which extends horizontally and in the direction of movement of carriage 182 along a horizontally extending, upwardly facing support surface 186 which is actually a rearward extension of previously described surface 146. This raceway is located centrally between two upstanding, inverted L-shaped flanges 188 and 190 which are best illustrated in FIG. 5. These flanges include horizontally extending, downwardly facing surfaces 192 and 194, respectively, for purposes to be discussed below. For the moment, it suffices to say that these downwardly facing surfaces extend in directions parallel to the movement of carriage 182 an amount at least equal to the amount of carriage movement. As will be seen below, these latter surfaces and raceway 184 cooperate with carriage 182 and four ball bearings to be discussed for allowing the carriage to move back and forth along its straight line path in a fixed horizontal plane.

Carriage 182 is shown including a front, generally rectangular section 196 (see FIG. 3) having a vertically downwardly facing underside against which read head 180 is mounted. The carriage also includes a narrower back section 198 having an underside which also faces vertically downward. As best illustrated in FIGS. 4 and 5, the underside of carriage section 198 includes two longitudinally spaced apart, downwardly facing slots or races 200, and 202 which are vertically aligned above upwardly facing race 184. Carriage sections 196 and 198 are supported in part for the back and forth movement of the overall carriage on race 184 by means of two ball bearings 204 and 206 disposed in race 184 and the slots 200 and 202, respectively. At the same time, the overall carriage includes a pair of arms 208 and 210 which are fixedly connected to and extend in opposite directions from carriage section 198 normal to the direction of movement of the carriage. One of the arms normally extend upward at acute angles to the horizontal while the other extends rigidly in a horizontal direction. The flexible arm, for example arm 208, is flexed downward so as to engage under and press against surface 192, as best seen in FIG. 5. The outermost ends of these arms include their own upwardly facing races 212 and 214 directly below surfaces 192 and 194, respectively. Two additional ball bearings 216 and 218 are respectively disposed within races 212 and 214 so as to roll within the latter and also against surfaces 192 and 194, respectively. Because of the spring-loaded (flexing) characteristics of arm 208, the ball bearings 116 and 118 and ball bearings 204 and 206 are held reliably in place on a fixed horizontal plane, as the overall carriage moves along its straight line path.

From FIG. 5, it should be apparent that races 184, 212 and 214 all have vertically upwardly facing, V-shaped cross sections. This configuration assures that the carriage itself moves in a straight line. Moreover, any dust or other such particulate material finding its way into the races will fall to the bottom without interfering with the ball bearings, unless of course, the particulate material is very large in which case it should be readily detectable. Also, for reasons to be discussed below, it should be noted that the race 214 has upwardly extending shoulders 220 and 222 at its opposite ends, and flange 190 includes opposite downwardly extending shoulders 224 and 226 at the opposite ends of surface 194, as best illustrated in FIG. 6. It should also be noted that these various shoulders are positioned relative to one another such that the upwardly extending shoulders are able to pass under the downwardly extending shoulders while the ball bearing 218 therebetween extends between the two and thereby prevents shoulder 222 from moving forward past shoulder 224 and shoulder 220 from moving rearwardly past shoulder 226. Thus, when carriage 182 is in its forwardmost position, race 214 and surface 194 are positioned relative to one another as illustrated by solid lines in FIG. 6, and when the carriage is moved to its rearwardmost position, the race 214 and surface 194 are positioned relative to one another in the manner illustrated by dotted lines in FIG. 6. The race 212 and cooperating surface 192 have similar shoulders and are positioned relative to one another in the same way.

Referring now to FIG. 4, attention is directed to a mechanism 230 which forms part of disc drive 204 and which is provided for maintaining carriage 182 in a fixed position when not in use and for preventing the ball bearings from freezing within their respective races. This mechanism is shown including a horizontally extending arm 232 which is located to one side of flange 188 and is slidably movable relative to the flange between a position partially extending into guideway 150 as indicated by solid lines in FIG. 4 and a rearward position entirely rearwardly of the guideway as indicated partially by dotted lines. This arm carries a cross bar 234 which moves with it from a position directly behind and in engagement with carriage arm 208 (again shown by solid lines in FIG. 4) to a more rearward position (shown by dotted lines). The arm and cross bar are spring-loaded in their forwardmost positions by means of a spring 236 connected at one end to the cross bar and at opposite end to a screw 238 fixedly connected to base 140 at the point shown in FIG. 4.

From the description of mechanism 230 just provided, it should be apparent that the spring 236 will maintain cross bar 234 in its forwardmost, solid line position illustrated in FIG. 4 so long as there is no disc cartridge within the disc drive. As a result, the cross bar maintains the carriage in its forwardmost position which, in turn, locks the ball bearings 216 and 218 in the positions corresponding to the one illustrated in FIG. 6 for ball bearing 218. In this way, during storage and especially during shipment of arrangement 104, the carriage is not only held in place, but the ball bearings 216 and 218 are prevented from freezing in place. At the same time, as disc cartridge 102 is moved into its operating position in disc drive 104, it engages the forwardmost end of arm 232 forcing the latter rearward against the urging of spring 236 and thereby taking cross bar 234 out of engagement with carriage arm 208. This allows the carriage arm to move freely along its straight line path without interference from mechanism 230. However, as the disc cartridge is removed from the disc drive, spring 132 causes cross bar 134 to again engage the arm 208 of carriage 182 forcing the latter into its forwardmost position.

Turning now to FIG. 7, attention is directed to the way in which the carriage is actually driven back and forth along its straight line path in order to move read/write head 180 back and forth along its straight line path across the information containing side 134 of disc body segment 122. As illustrated in FIG. 7, a needle 240 which may be identical to a phonograph needle is fixedly supported to the underside of carriage section 196 at the very front of the latter. The needle is specifically configured so as to extend vertically downward. At the same time, it has a certain degree of vertical spring-like action so as to be forcible vertically upward while being restrained from moving horizontally. To this end, the needle includes a support stem 242 which extends sideways from the needle relative to the movement of the carriage and vertically upward where it is fixedly connected to one side of carriage section 196 by means of screw 246, as best illustrated in FIG. 3. The needle itself is disposed under the slot in the underside of carriage section 196 so as to accommodate the vertical movement of the needle just described.

Needle 240 is positioned on carriage section 196 so as to engage groove 126 when disc arrangement 102 is placed in its operating position in arrangement 104. This is best illustrated in FIG. 10. Once the needle is within this cooperating groove, the disc body 118 can be rotated either clockwise or counterclockwise in the manner described previously. This causes the needle to move forward or rearward while remaining in the groove, depending upon the direction of the disc body, along its own straight line path between extreme points at the radially innermost end of the spiral groove to its radially outermost end. This, in turn, causes the carriage to move back and forth along its straight line path which in turn moves the read/write head back and forth along its straight line path. As a result, by controlling the amount of rotation of the disc and its direction, the head can be precisely positioned over information bearing surface 134 for storing onto and retrieving information from the disc.

In actually storing and retrieving information, it is important that the read/write head be positioned in sufficiently close proximity to surface 134 in order to store and retrieve the information. To this end, arrangement 104 includes a pad 150 which is supported in spring-loaded engagement against the underside of head 180 by means of leaf spring 152 or the like. The leaf spring is fixedly supported at its rearward end to surface 146 by means not shown. Its forwardmost end carries the pad which has an outwardly and downwardly tapering surface 254. This latter surface serves to receive the forwardmost end of disc body segment 122 as the latter moves into its operating position. As this happens, the pad is forced downward to allow disc segment 122 to move between the pad and the read head, whereupon the pad acts as a means for urging surface 134 against the underside of the read head. At the same time, as the overall disc arrangement moves into its operating position, needle 246 moves into its position in groove 126.

Having described overall assembly including disc arrangement (disc cartridge) 102 and information retrieval arrangement (disc drive) 104, it should be apparent that the disc arrangement could include a slidable cover as stated previously. At the same time, arrangement 104 could include means similar to those described in previously recited application Ser. No. 455,474 for automatically moving the cover between its opened and closed position as arrangement 102 is moved into and out of its operating position in arrangement 104. It should also be apparent that the disc arrangement 102 could be operated on either its top side or its bottom side in the manner described above.

Having described overall disc cartridge 102 and disc drive 104, attention is now directed FIGS. 12-26 which together illustrate a disc drive and the cooperating disc cartridge, both of which are designed in accordance with a second, actual working embodiment of the present invention. The disc drive is indicated generally by reference numeral 300 and the cartridge is shown only in FIGS. 25 and 26 at 302, in its operating position within the disc drive. As will be seen hereinafter, many of the features of disc drive 300 and cartridge 302 are identical to corresponding features of the disc drive and cartridge illustrated in FIGS. 1-11 and therefore these features will not be discussed in detail again. On the other hand, there a number of features of the actual working embodiment that were not illustrated in the overall information storage and retrieval assembly of FIGS. 1-11. These features will be discussed in detail below.

Referring initially to FIGS. 25 and 26, attention is directed specifically to disc cartridge 302 which is identical to previously described cartridge 102, except for its disc which is indicated at 304 (FIG. 26). Thus, cartridge 302 includes the same housing 106 and pin bearing 138. The disc itself includes an inner circumferential segment 306 and an outer segment 308, each of which corresponds in function to segments 120 and 122 of disc 118, respectively. However, the inner circumferential segment 306, rather than being formed as a single unit, is formed as a laminate including confronting subsections 306a and 306b which together define opposing hubs 309a, 309b and opposing grooved areas 310a, 310b. Outer segment 308, rather than extending only partially into the inner segment as in the embodiment illustrated in FIG. 2, extends entirely between subsegments 309a and 309b and these three components are bonded together to form the overall laminate.

In accordance with the present invention, the outermost circumferential edges of subsections 306a and 306b are spaced apart from one another and the confronting surfaces of these subsections taper inward from this edge so as to define an inwardly tapered annular space 312 which closes against segment 308 along an annulus short of hubs 309a, 309b. The space 312 which is generally V-shaped in cross section allows the segment 308 (which corresponds to outer segment 122 and therefore is flexible) to flex within space 312. This is in contrast to the radially innermost flexing point of segment 122 of disc 118 which is limited to the outermost circumferential edge of segment 120. The importance of this will become apparent hereinafter during a discussion of the way in which the disc is placed into its operating position within the disc drive and specifically the way in which segment 308 is placed into engagement with the disc drive's read/write head.

Having described disc cartridge 302, attention is now directed to disc drive 300 which is shown including a fixed support base 314 (see FIG. 17), a drive mechanism 316 (see FIG. 14) and a carriage 318 (see FIGS. 13 and 17). Support base 314 which corresponds to support base 140 forming part of overall disc drive 104 serves to receive the disc cartridge 302 and it also supports the drive mechanism 316 and carriage 318 as well as serving as a frame of reference for all of the components making up the disc drive. The drive mechanism 316, which corresponds in function to drive mechanism 154 of disc drive 104 serves to rotate disc 304, either clockwise or counterclockwise, in a controlled manner when the disc cartridge is in its operating position within the disc drive. Carriage 318, which corresponds to previously described carriage 182, is mounted to fixed support base 134 for back and forth movement in the same manner as carriage 182 for moving a read/write head 320 (see FIG. 13) across segment 308 of the disc in the same manner as read/write head 180.

Referring specifically to support base 314, the latter is shown including an upwardly facing, horizontally extending surface 322 for slidably receiving and supporting disc cartridge 302 in a predetermined operating position, as indicated in FIGS. 25 and 26. Note that the cartridge moves horizontally into its operating position without having to drop onto an awaiting spindle. Rather, as will be seen below, once the overall disc cartridge reaches its operating position, it is ready to be rotated by means of mechanism 316.

Referring specifically to FIGS. 14, 16 and 21, the drive mechanism 316 is shown in detail. This mechanism is functionally identical to previously described mechanism 154 and hence will not be described in detail. It suffices to say that overall mechanism 316 includes a reversible drive motor 324 having a drive shaft 326 which carries an uppermost puck 328 located over surface 322 at a position of engagement with the downwardly extending hub of disc 304 when the latter is placed in its operating position. Like motor 156, motor 324 is spring loaded against the underside of fixed base 314 in the manner specifically illustrated in FIGS. 14 and 16 so as to bias puck 328 against its engaging hub. At the same time, this provides a degree of give to the puck such that the precise operating position of the hub is not critical so long as it moves into the disc drive sufficiently far to engage the puck. To this end, drive motor 324 is supported by means of arms 330 for pivotal movement about support pin 332. The motor is biased in the position illustrated in FIG. 16 by means of spring 334. Thus, as the disc 304 is moved into its operating position, its lowed hub engages puck 328 causing the latter to move from its bias position, as indicated by arrow 336, to an operating position illustrated in FIG. 25. To accommodate this movement, the two arms not supported around pin 332 are supported for movement against cooperating support surfaces 340.

Having described the way in which disc 304 is caused to rotate by means of drive puck 328, attention is now directed to carriage 318. As stated above, this carriage serves to move read/write head 320 across the information bearing segment 308 of the disc when the latter is in its operating position. To this end, overall base 324 includes various components for supporting the carriage for its back and forth movement along a fixed, straight line path within a fixed horizontal plane in the same way as previously described base 140 supports carriage 182. To this end, base 106 includes a pair of vertically upwardly facing central raceways 342 and 344 which extend horizontally and in the direction of movement of carriage 318 along a horizontally extending, upwardly facing support surface 346 which is actually rearward of receiving surface 322. Each of these raceways has a V-shaped cross section (see for example FIG. 18) and supports a cooperating ball bearing. A forwardmost ball bearing 348 is disposed within raceway 342 and a rearward ball bearing 350 is disposed within raceway 344. The carriage itself includes its own base 352 defining vertically downwardly facing raceways 354 and 356, each of which has a corresponding V-shaped cross section. The raceway 354 cooperates with raceway 342 for containing ball bearing 348 and the raceway 356 cooperates with raceway 344 for containing ball bearing 350 in the same manner as previously described raceway 184 and cooperating raceways 200 and 202 forming part of overall disc drive 104.

In addition to the central raceways just described, carriage 318 includes vertically upwarding facing lateral raceways 358 and 360 which are also V-shaped in cross section, as best seen in FIG. 18. These raceways are defined by opposing carriage arms 362 and 364 which extend laterally out from opposite sides of the carriage's main body which is generally indicated at 366 in FIG. 18. These laterally extending arms correspond in function to the arms 208 and 210 forming part of carriage 182 and thus contain cooperating ball bearing 368 and 370. As best illustrated in FIG. 18, support base 314 includes opposing flanges 372 and 374 having vertically downwardly facing bearing surfaces 376 and 378, respectively, in cooperating positional relationship with raceways 358 and 360, respectively, for containing ball bearings 368 and 370 in the same manner as the cooperating raceways 212 and 214 and flanges 188 and 190 forming part of disc drive 104. However, in this latter disc drive, one of the arms 208 is caused to flex downward below the cooperating shoulder 188 in order to maintain the carriage in a horizontal plane. In disc drive 300, the flange 374 forms one end of an overall arm 380 which is pivotally mounted at its other end to a cooperating pivot 382 such that the flange is pivotally movable to a limited degree vertically downward, as indicated by arrow 384. The flange is biased in its downward direction by means of a biasing spring 386, thereby causing bearing surface 378 to urge downward against ball bearing 370. This, in turn, causes the entire carriage to want to pivot in the same direction about the ball bearings 348 and 350. As a result, the arm 362 defining raceway 358 is urged upward in the direction of arrow 386, thereby urging ball bearing 368 against bearing surface 376.

From the foregoing, it should be apparent that the two ball bearings 348 and 350 in their cooperating raceways confine the overall carriage to a straight line path, e.g. the path of their raceways which lie on a single line. At the same time, the two ball bearings 368 and 370 fix the plane of movement of the carriage. In the particular embodiment illustrated, all four ball bearings lie in the same plane. Thus, the ball bearings not only serve as a practically friction free way of moving the carriage back and forth but also as an uncomplicated and yet reliable means of fixing the plane of movement of the carriage.

Returning briefly to the disc drive 104, it may be recalled that its carriage 182 is maintained in a forwardmost position on support base, in the absence of disc cartridge 102 and that this is accomplished by means of mechanism 120 best illustrated in FIG. 4. Disc drive 300 includes a mechanism generally indicated at 390 in FIG. 17 for the same purpose. This mechanism includes a triangular cam member 392 which is pivotally mounted at one point of the triangle to a cooperating pivot pin 394 such that a cam arm 395 located at a second point is movable in the direction of two-way arrow 396. This cam arm is urged in the forward direction, that is, to the right, as viewed in FIG. 17, by means of a biasing spring 398 against the rearward end of carriage base 352. This, in turn, biases the entire carriage in its forwardmost position, in the absence of disc cartridge 302, as best illustrated in FIG. 13. Note that the two ball bearings 348 and 350 are locked into place when the carriage is in this position. This is also true for ball bearings 368 and 370, although this is not shown. As the disc cartridge moves into its operating position, the forwardmost side 400 of its housing 106 engages the third point of the triangular cam causing the latter to pivot rearwardly such that extension arm 394 moves out of engagement with the carriage, as best illustrated in FIG. 25, thereby freeing the carriage to move back and forth on its cooperating ball bearings.

Again referring to disc drive 104, it may also be recalled that its read/write head 180 is mounted under carriage 182 so as to face downward and cooperate with an upwardly facing pad 250 for receiving flexible segment 122 of disc 118. At the same time, the carriage carries with it a downwardly extending needle 240 for engagement with the cooperating grooved section of the disc. In disc drive 300, its read/write head 320 is fixedly supported on a base 400 on carriage 318 so as to face vertically upward, as best illustrated in FIG. 13. This places the head's pickup surface 402 in a fixed horizontally extending plane generally indicated by dotted lines 404. At the same time, the cooperating pad 406 is mounted directly over pickup surface 402 at one end of a pad arm 408, the other end of which is pivotally connected to a pivot 410 so that pad 406 is free to move to a limited extent down against the read/write head and upwardly away from it. A biasing spring 412 is provided for biasing the pad connecting end of arm 408 downward so that the pad is biased against pickup surface. For reasons to be described directly below, the forwardmost edge of read/write head 320 defines an upwardly and forwardly inclined bevel 414 while the forwardmost end of pad arm 408 defines a downwardly and forwardly inclined bevel 416. Regarding pad 406, it should be noted that this pad could be replaced with a second read/write head so that both sides of the disc could be acted upon simultaneously.

Referring to FIG. 26, attention is now directed to the way in which flexible segment 308 of disc 304 is caused to engage against pickup surface 402 of read/write head 320 as the overall disc cartridge is moved into its operating position. At the outset, it should be noted that the plane through which section 308 moves in its natural (unflexed) state before reaching head 320 is a plane parallel with but slightly lower than plane 404, as indicated by dotted line 406 in FIG. 13. Note that plane 406 extends through the bevel 414 of head 320. Thus, as the disc moves into its operating position, the forwardmost edge of flexible segment 308 engages and rides up bevel 414 and thereafter between pickup surface 402 and the confronting face of pad 406. This causes the adjacent section of flexible segment 308 to flex upward. However, as best illustrated in FIG. 26, rather than flexing at the forwardmost edge of segment 308, space 312 allows the flexing to take place along a greater length of segment 308, thereby placing less stress on the flexible segment and allowing the section of the flexible segment engaging against head 320 to more accurately conform to the head's pickup surface.

As illustrated best in FIGS. 13 and 26, carriage 318 carries a needle 420 which corresponds in function to previously described needle 240 forming part of overall disc drive 104. However, needle 420 is supported in an upwardly vertically extending direction from a support arm 422 which is pivotally mounted at one end to a pivot 424. The pivot arm 422 is spring loaded by means of spring 426 so that the needle 420 is urged vertically upward. The forwardmost end of arm 422 defines a vertically upward and outward inclined bevel 428 which serves as a guide to the grooved section of segment 306 as the overall cartridge is moved into its operating position such that the needle ultimately engages the cooperating grooves, as best illustrated in FIG. 26.

In the actual embodiment just described, the flexible segment 308 and segment 306 are both constructed of the same material or different materials with similar thermal coefficients of expansion, as is the carriage body. In this way, both the disc 306 and the carriage body display the same coefficient of thermal expansion which means that if one thermally expands so will the other the same amount, thereby maintaining the relative positions of read/write head 320 and disc segment 308 constant relative to one another with regard to thermal expansion. Still referring to disc 304 and actually the overall cartridge type information storage disc arrangement 302, as will be seen below, this arrangement is designed to cooperate with the disc drive 300 in order to provide a variable speed servo control feature allowing the speed of the disc to be continuously monitored and its speed controlled by means of a servo feedback mechanism.

Referring to FIGS. 27–30, the overall disc arrangement 302 is shown apart from disc drive 300. FIG. 27 specifically illustrates the disc arrangement's housing 106 which is shown including a slidably mounted cover or shutter as it is also referred to generally indicated at 500. This shutter corresponds in function to the one disclosed in the previously recited copending application. Thus, the shutter remains closed so as to close the space 116 (see FIG. 1) when the overall arrangement is not in its operating position within disc drive 300. At the same time, the overall disc arrangement is designed to cooperate with the disc drive so as to automatically open the shutter and expose space 116 as the disc arrangement moves into the disc drive. To this end, disc drive 300 includes cooperating shoulder means generally indicated at 502 in FIG. 17 for causing the shutter to move from its closed position to its open position. Note that one of these shoulders is for opening the shutter when the disc arrangement is placed in its operating position on one side and the other shoulder functions to open the shutter when the disc arrangement is turned over. As best illustrated in FIG. 28, the shutter is maintained in its closed position by means of a biasing spring 504.

Referring to FIGS. 29 and 30, the disc itself, 304, is illustrated in detail in its operating position within housing 106 and around bearing pin 138. Note specifically that only segment 310 is comprised of two subsegments 310a and 310b while the hub is solid in this version. In both embodiments, the previously described recess 312 is provided for the reasons discussed above.

Returning to FIG. 28, attention is directed to another feature of the overall disc arrangement which has not been discussed thus far. Specifically, reference is directed to the hub itself which is shown to include the series of equally circumferentially spaced, equally sized spaces 506 defined between identical, equally circumferentially spaced spokes 508. With the shutter 510 in its opened position, a section of the hub can be seen from outside housing 106, as best illustrated in FIGS. 1 and 26. As seen in this latter figure, a conventional optical sensing device generally indicated at 510 may be provided as part of overall disc drive 300. This device includes a combination light source/sensor 512 fixedly mounted with the fixed support base 314 at a point immediately above the exposed part of hub 309 when the drive 304 is in its operating position. Means 512 serves to direct a beam of light (or other suitable electromagnetic radiation) downward into the spokes and spaces of the hub and serves to receive the light reflected back by the spokes. Thus, the means 512 serves to produce a modulated optical output signal having a frequency corresponding to the speed of the disc as the latter rotates. This signal is applied to conventional electronics forming part of the overall device 510, as generally indicated at 514. The electronics 514 are operatively connected to the motor 324 so as to control the speed of the latter in response to the actual speed of the disc as indicated by the incoming optical signal in order to maintain the speed of the disc at the appropriate level which may be a variable rate rotational speed in order to provide a fixed head to disc speed and also achieve approximately 30% more data storage than a constant rotational speed system. Overall device 510 per se is conventional and readily providable by one with ordinary skill in the art.

What is claimed:

1. An information storage and retrieval assembly, comprising:
   (a) a cartridge type of information storage disc arrangement having a cartridge housing and a storage disc including a disc body mounted within said housing for rotation about a central axis of rotation, said body including opposite sides, at least one of which includes information stored or storable magnetically thereon in a given storage area extending concentrically around said central axis;
   (b) an information storage and retrieval arrangement including
      (i) means supporting said disc arrangement with the storage disc mounted in its housing in a predetermined operating position for rotation of said disc body about its central axis,
      (ii) means including a magnetic read/write head and means supporting said head for movement back and forth along a fixed, straight line path radially across said information containing area on said disc body and in sufficiently close proximity to said area to magnetically store information in order to retrieve information from said area, and
      (iii) means for engaging said disc body directly at a location spaced from the disc's central axis but in a way which rotates said disc body about its central axis, in both one direction and in an opposite direction, about said axis, when said disc arrangement is in said predetermined operating position; and
   (c) means for moving said read/write head back and forth along said straight line path.

2. An assembly according to claim 1 wherein said read/write head moving means forms part of said disc arrangement and part of said storage and retrieval arrangement for moving said read head in one direction along its straight line path in response to said one direction of rotation of said disc arrangement and in the opposite direction along said path in response to the opposite direction of rotation of said disc arrangement.

3. An assembly according to claim 2 wherein said disc arrangement includes a pin bearing fixedly disposed within said cartridge housing about which said disc body rotates, wherein said means for rotating said disc body does so without using a central drive spindle which normally extends up into a cooperating central opening in a disc and wherein said information storage arrangement includes means for guiding the disc arrangement horizontally into said predetermined operating position without having to vertically drop the disc arrangement onto an awaiting spindle.

4. An assembly according to claim 3 wherein said read/write head moving means includes a spiral read head guide track in a second given area on said one side of said disc body, concentrically disposed around said central axis, and means connected with said read/write head support means and responsive to the rotation of said track as the latter rotates for moving said read head back and forth along its straight line path as said track rotates in said one and opposite directions about said central axis.

5. An assembly according to claim 3 wherein said disc includes a first gear in the form of a hub connected with and extending out from one of the sides of said disc body in coaxial relationship to the disc body and raidally inward of said given area, and wherein said means for engaging said disc body directly includes a second gear supported in a position to automatically engage said first gear when said disc arrangement is moved into said predetermined operating position, and means for rotating said second gear in one direction and an opposite direction about its own axis in a controlled manner, said gears being configured so that rotation of said second gear causes said first gear to rotate when the two are in engaging relationship with one another.

6. An assembly according to claim 2 wherein said means supporting said read/write head for movement includes a fixed support structure, and a movable carriage supported for movement along its own straight line path against said supporting structure by means of a plurality of ball bearings disposed within their own races defined by and located between said support structure and carriage.

7. An assembly according to claim 6 wherein said ball bearings include four such ball bearings and wherein said fixed structure and the movable carriage cooperate with said four ball bearings so as to always maintain the carriage in a fixed plane through its movement along said straight line path.

8. An assembly according to claim 6 wherein said ball bearings consist of four in all, wherein said races are of discrete lengths, and wherein said read head supporting means includes means for preventing said bearings from freezing in place at the ends of their respective races.

9. An assembly according to claim 8 wherein said carriage includes an elongated main body extending longitudinally in its direction of movement and supported on two of said ball bearings and a pair of resilient support arms extending outward from opposite sides of said main body, said support arms being maintained in downwardly flexed positions below corresponding segments of said support structure with the remaining two ball bearings therebetween with the support arms urged against their respective ball bearing, whereby to maintain these latter two ball bearings, in place in their respective races.

10. An assembly according to claim 8 wherein said carriage includes a main body extending in its direction of movement and supported on two of said ball bearings and a pair of support arms extending outward from opposite sides of said main body wherein said fixed support structure includes race defining means for urging down on one of said last-mentioned ball bearings so as to cause the other one thereof to move upward against a second race defining means forming part of said fixed support structure.

11. An assembly according to claim 2 wherein said disc arrangement supporting means includes means for allowing said disc arrangement to be placed in said predetermined operating position and for continuously urging said disc body against said read/write head along a segment of said disc body in line with the straight line path of said read/write head.

12. An assembly according to claim 11 wherein said last-mentioned means includes a pad and spring means for supporting said pad in a spring loaded manner against the side of said disc body opposite its information containing side, said pad being tapered in a way which allows said disc body to move between it and said read head as said disc arrangement is moved into said predetermined position.

13. An assembly according to claim 2 wherein said read/write head supporting means includes means for supporting said head for said back and forth movement in a fixed plane, wherein said storage disc includes an outermost flexible circumferential section including said given storage area, wherein said disc arrangement support means includes means for supporting said disc in said operating position such that the unflexed position of said flexible circumferential section is parallel with but slightly below the fixed plane of said head, and wherein said head includes means for guiding said flexible section into a flexed operating position within said fixed plane.

14. An assembly according to claim 13 wherein said read/write head supporting means includes pad means disposed adjacent said read/write head for engaging said flexible circumferential section of said disc on a side opposite said head.

15. An assembly according to claim 1 wherein said disc arrangement includes a bearing pin fixedly connected with said cartridge housing in coextensive relationship with the central axis of said disc body for supporting said disc body for rotation about said central axis.

16. An assembly according to claim 1 wherein said storage disc body is in the form of a laminate including a pair of concentric outer, rigid annular segments with a flexible disc of greater outer diameter concentrically therebetween, said flexible disc including an annular section radially outside said rigid segments serving as said storage area.

17. An assembly according to claim 16 wherein the outermost edges of said rigid segments are spaced from one another and wherein the confronting faces of said rigid segments taper toward one another from said spaced edges whereby to define an outermost annular space between said segments within which a corresponding annular section of said flexible disc is free to move.

18. An information storage and retrieval assembly comprising:
   (a) a cartridge type of information storage disc arrangement including
      (i) a cartridge housing including fixed bearing member therein,
      (ii) a disc shaped body mounted within said housing in cooperating engagement with said bearing member so as to rotate about a central axis of rotation, said body having opposite sides, at least one of which includes information stored or storable magnetically thereon in a first area around said central axis, and
      (iii) a spiral read head guide track in a second area on said one side of said disc body, said track being concentrically disposed around said central axis;
   (b) an information storage and retrieval arrangement including
      (i) means supporting said disc arrangement in a predetermined operating position for rotation of said disc body about its central axis while said disc body remains in said housing,
      (ii) means including a magnetic read/write head and means supporting said read head for movement back and forth along a fixed, straight line path radially across the information containing first area on said one side of said disc body and in sufficiently close proximity to said first area to magnetically store information in or retrieve it from said area, and
      (iii) means responsive to the rotation of said spiral guide track as the track rotates with said disc body for moving said read head in one direction along said path when said disc body and track rotate in one direction and in an opposite direction along said path when said disc body and track rotate in an opposite direction, whereby said read head can be precisely positioned on said path for retrieving information in a controlled, predetermined fashion; and
   (c) means forming part of said disc arrangement and part of said retrieval arrangement for rotating said disc body while the latter remains in said housing in a controlled manner about its central axis, in in one direction and an opposite direction relative to said central axis when said disc arrangement is in said predetermined position.

19. An assembly according to claim 18 wherein said rotating means includes a first rotatable gear member connected to and forming part of said disc body and having its axis of rotation colinear with said central axis, a second rotatable gear member forming part of said retrieval arrangement and positioned to engage said first gear member when said disc arrangement is supported in said predetermined operating position by said supporting means, and means for rotating said second gear member in a controlled manner in one direction and an opposite direction about its own axis of rotation, said first and second gear member being configured such that rotation of said second gear member causes said first gear member to rotate when the two are in engagement with one another.

20. An assembly according to claim 19 wherein said first gear member is in the form of a hub connected with and extending out from one of the sides of said disc body radially inward of said first and second areas.

21. An assembly according to claim 20 wherein said second gear member includes a second gear, means supporting said gear in its engaging position with said hub and for limited movement from this position in a direction transverse to its axis of rotation, said last-mentioned support means including means for biasing said gear in said hub engaging position.

22. An assembly according to claim 21 wherein said means for rotating said second gear includes a motor having an output shaft, wherein said second gear forms part of said output shaft, and wherein said means supporting said second gear includes means for supporting said motor for said limited movement and for biasing said motor in a position which allows the second gear to engage said hub when the disc arrangement is supported in said predetermined operating position.

23. An assembly according to claim 19 wherein said first and second gear members are configured such that the second gear member frictionally engages the first gear member in order to cause the latter to rotate.

24. An assembly according to claim 19 wherein said first and second gear members display different size ratios.

25. An assembly according to claim 24 wherein said first gear member is larger than said second gear member whereby the two act as a speed reduction gear.

26. An assembly according to claim 18 wherein said guide track is in the form of a spiral groove and wherein said read head moving means includes a needle fixedly connected with said read head support means for engagement in said spiral groove whereby rotation of said groove in clockwise and counterclockwise directions causes said needle to move back and forth along its own straight line path of movement which, in turn, causes said read head support means to move said read head back and forth along its straight line path.

27. An assembly according to claim 18 wherein said bearing member includes a bearing pin fixedly connected within said cartridge housing in coextensive relationship with the central axis of said disc body for supporting said disc body for rotation about said central axis.

28. An information storage and retrieval assembly, comprising:
 (a) an information storage disc arrangement including
  (i) a disc shaped body having a central axis of rotation and opposite top and bottom sides, said top side including information stored magnetically thereon in a first area extending concentrically around said central axis,
  (ii) a spiral groove in a second area on the top side of said disc body, said groove being concentrically disposed around said central axis and serving as a read head guide track and
  (iii) a central hub connected with and extending downward from the bottom side of said disc body in a coaxial relationship with said body and radially inward of said first and second areas, said hub serving as a gear for rotating the disc body about its central axis when the hub itself is rotated; and
 (b) an information retrieval arrangement including
  (i) means supporting said disc arrangement in a predetermined position for rotation about the central axis of its disc body,
  (ii) means for guiding said disc arrangement into said predetermined position along a horizontally extending path only without having to drop the disc arrangement onto an awaiting spindle or like drive mechanism,
  (iii) means including a magnetic read/write head for storing the information on or retrieving it from the top side of said disc body,
  (iv) means for supporting said read/write head for movement back and forth along a fixed straight line path radially across the information containing area on the top side of said disc body and in sufficiently close proximity to said first area to magnetically store the information on or retrieve it from said area, said read/write head support means including a fixed support structure, a carriage on which said read head is mounted, and a plurality of ball bearings supporting said carriage on said fixed structure for back and forth movement in a fixed plane along its own straight line path in order to move said read/write head along its straight line path, said fixed support structure and said carriage together defining an elongated race for each of said ball bearings,
  (v) a needle mounted to and for movement with said carriage and positioned for engagement with said spiral groove such that rotation of the spiral groove in either of opposing directions about said central axis causes said needle to move back and forth along its own straight line path which in turn causes said read/write head support means to move back and forth about its straight line path, thereby moving said read/write head back and forth along its straight line path, and
  (vi) means for rotating said hub in one direction and an opposing direction around its axis in a controlled manner when said disc arrangement is in said predetermined position whereby said read/write head can be precisely positioned on its straight line path of movement for retrieving information in a controlled, predetermined fashion, said rotating means including a reversible motor which includes an output shaft rotatable both in one direction and an opposing direction about its own axis, said motor being mounted to said support structure, and a gear forming part of said output shaft, said gear being positioned for engagement with said hub when said disc arrangement is placed in said predetermined position, said gear and said hub being configured such that rotation of said gear causes said hub to rotate when the two are in engaging relationship with one another.

29. An assembly according to claim 28 wherein said ball bearings consist of four in all, wherein said recesses are of discrete lengths, each of which has a V-shaped cross section along its underside and wherein said read/write head supporting means includes means for preventing said bearing from freezing in place at the ends of their respective races, said last-mentioned means also cooperating with said carriage for holding the latter in place when the assembly is not in use.

30. An assembly according to claim 28 wherein said information retrieval arrangement includes means for supporting said needle to said carriage in a horizontally fixed position and a vertically movable position to a limited extent, said last-mentioned means biasing said needle vertically downwards whereby to allow the needle to be initially located within said spiral groove.

31. An assembly according to claim 28 wherein the bottom side of said disc body includes information stored magnetically thereon in an area around said central axis, wherein a second area on said bottom side includes a spiral groove concentrically disposed around said central axis and serving as a read head guide track, and wherein a second hub corresponding in function to said first mentioned hub is fixedly connected to and extends out from the top side of said disc body concentrically around said central axis and radially inward of the information bearing area, and the spiral groove on said bottom side, whereby said disc arrangement can be used with said information retrieval arrangement on either side of said disc body.

32. An assembly according to claim 28 wherein said disc arrangement includes a housing for containing said disc body and a bearing pin fixedly contained within said housing in coaxial relationship with said disc body for supporting the latter for rotation.

33. An information storage and retrieval assembly comprising:
 (a) a cartridge type of information storage disc arrangement including
  (i) a cartridge housing including a fixed bearing member therein, and
  (ii) a disc shaped body mounted within said housing in cooperating engagement with said bearing member so as to rotate about a central axis of rotation, said body having opposite sides, at least one of which includes information stored or storable magnetically thereon in a first area around said central axis;

(b) an information storage and retrieval arrangement including means supporting said disc arrangement in a predetermined operating position for rotation of said disc body about its central axis while said disc body remains in said housing; and (c) drive means forming part of said disc arrangement and part of said retrieval arrangement for rotating said disc body about its central axis in a controlled manner in one direction and an opposite direction relative to said central axis, while the disc body remains in said housing and when said disc arrangement is in said predetermined position, said drive means including a first annular surface which forms part of said disc body and which extends around said central axis and means forming part of said arrangement, last-mentioned means including a rotatable member having a second annular surface engagable against said first annular surface for rotating said first surface and therefore said disc body about said central axis and means for rotating said rotatable member.

34. An assembly according to claim 33 wherein said disc shaped body includes a central hub which defines said first annular surface and wherein said drive means includes a drive puck which serves as said rotatable member having said second annular surface and motor means for rotating said drive puck.

35. An information storage and retrieval assembly comprising:

(a) a cartridge type of information storage disc arrangement including
 (i) a cartridge housing including a fixed bearing member therein, and
 (ii) a disc shaped body mounted within said housing in cooperating engagement with said bearing member so as to rotate about a central axis of rotation, said body having opposite sides, at least one of which includes information stored or storable magnetically thereon in a first area around said central axis;

(b) an information storage and retrieval arrangement including means supporting said disc arrangement in a predetermined operating position for rotation of said disc body about its central axis while said disc body remains in said housing; and (c) drive means forming part of said disc arrangement and part of said retrieval arrangement for rotating said disc body in a controlled manner about its central axis, in one direction and an opposite direction relative to said central axis, while said disc body remains within said housing and when said disc arrangement is in said predetermined position, said drive means including means for engaging said disc body directly at a location spaced from the disc body's central axis but in a way which rotates the disc body about its central axis.

* * * * *